US012608850B2

(12) United States Patent
Lv et al.

(10) Patent No.: US 12,608,850 B2
(45) Date of Patent: Apr. 21, 2026

(54) METHOD AND APPARATUS FOR GENERATING LATENT IMAGE, COMPUTER STORAGE MEDIUM, AND ELECTRONIC DEVICE

(71) Applicant: Samsung Electronics Co., Ltd., Suwon-si (KR)

(72) Inventors: Lu Lv, Nanjing (CN); Bin Li, Nanjing (CN); Jun Xie, Nanjing (CN); Shouchen Yin, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 18/750,127

(22) Filed: Jun. 21, 2024

(65) Prior Publication Data

US 2025/0078332 A1     Mar. 6, 2025

Related U.S. Application Data

(63) Continuation of application No. PCT/KR2024/005609, filed on Apr. 25, 2024.

(30) Foreign Application Priority Data

Aug. 28, 2023    (CN) .......................... 202311096074.5

(51) Int. Cl.
| | |
|---|---|
| *G06T 11/00* | (2006.01) |
| *G06F 3/14* | (2006.01) |
| *G06V 10/44* | (2022.01) |

(52) U.S. Cl.
CPC ................ *G06T 11/00* (2013.01); *G06F 3/14* (2013.01); *G06V 10/44* (2022.01)

(58) Field of Classification Search
CPC ............ G06T 11/00; G06F 3/14; G06V 10/44
See application file for complete search history.

(56) References Cited

U.S. PATENT DOCUMENTS 9,684,935 B2 * 6/2017 Matas .................... G06Q 50/01
11,132,926 B2    9/2021 Chang et al.
(Continued)

FOREIGN PATENT DOCUMENTS

CN        111752509 A      10/2020
CN        116233491 A      6/2023
(Continued)

OTHER PUBLICATIONS

International Search Report dated Aug. 5, 2024, issued in International Application No. PCT/KR2024/005609.

*Primary Examiner* — Jitesh Patel
(74) *Attorney, Agent, or Firm* — Jefferson IP Law, LLP

(57) ABSTRACT

A method and an apparatus for generating and displaying a latent image, a storage medium, and an electronic device are provided. The method includes acquiring a behavior text vector representing a behavior state of a device and an attribute text vector representing a display attribute of the device, acquiring an image text vector and an image feature element of a basic image, combining vector values of the behavior text vector, the attribute text vector, and the image text vector to obtain a relevant vector combination, the relevant vector combination being a combination including a value of the behavior text vector, a value of the attribute text vector, and a value of the image text vector, inputting all the relevant vector combinations into a pre-trained semantic script generation model for processing to generate a semantic script text for describing latent image generation requirements, inputting the semantic script text and the image feature element into a pre-trained conditional image generation model for processing to generate a latent image corresponding to the behavior state of the device, and displaying the corresponding latent image based on the behavior state of the device.

20 Claims, 17 Drawing Sheets

(56) References Cited

U.S. PATENT DOCUMENTS

| | | | |
|---|---|---|---|
| 2014/0062856 A1 | 3/2014 | Lu et al. | |
| 2017/0322597 A1* | 11/2017 | Lee | G06F 1/1615 |
| 2019/0163747 A1* | 5/2019 | Kang | G06F 40/42 |
| 2019/0279409 A1* | 9/2019 | Kim | G06N 3/094 |
| 2020/0174646 A1 | 6/2020 | Park et al. | |
| 2020/0225706 A1* | 7/2020 | Jung | G06F 1/1677 |
| 2020/0389578 A1 | 12/2020 | Lee et al. | |
| 2021/0365278 A1 | 11/2021 | Klein et al. | |
| 2022/0004825 A1* | 1/2022 | Xie | G06N 3/045 |
| 2022/0005388 A1 | 1/2022 | Klein et al. | |
| 2022/0147106 A1 | 5/2022 | Hirakata et al. | |
| 2022/0245391 A1 | 8/2022 | Badjatiya et al. | |
| 2024/0069601 A1 | 2/2024 | Kim et al. | |
| 2024/0333831 A1 | 10/2024 | Pedan et al. | |

FOREIGN PATENT DOCUMENTS

| | | |
|---|---|---|
| CN | 117152286 A | 12/2023 |
| KR | 10-2012-0010691 A | 2/2012 |
| KR | 10-2021-0156470 A | 12/2021 |
| KR | 10-2022-0166078 A | 12/2022 |
| KR | 10-2023-0111461 A | 7/2023 |

* cited by examiner

The wallpaper will be cut to be displayed on the cover
screen after the device is folded Current state $$p(x_t|y) = N(x_t, T(y), \alpha(t)|x_0, \sigma^2(t))$$

folding a device to the right side

Wallpaper displaying
dynamically to move to the right folding a device to the left side Wallpaper displaying
dynamically to move to the left

METHOD AND APPARATUS FOR GENERATING LATENT IMAGE, COMPUTER STORAGE MEDIUM, AND ELECTRONIC DEVICE

CROSS-REFERENCE TO RELATED APPLICATION(S)

This application is a continuation application, claiming priority under § 365(c), of an International application No. PCT/KR2024/005609, filed on Apr. 25, 2024, which is based on and claims the benefit of a Chinese patent application number 202311096074.5, filed on Aug. 28, 2023, in the China National Intellectual Property Administration, the disclosure of which is incorporated by reference herein in its entirety.

BACKGROUND

Field

The disclosure relates to image processing technology. More particularly, the disclosure relates to a method and apparatus for generating a latent image, a computer storage medium, and an electronic device.

Description of Related Art

With the rapid development of electronic technology, electronic devices appear in various forms in our lives and work, for example, a mobile terminal device with a flip or fold function, and a television terminal supporting screen rotation. Unlike display devices of the related art, these new devices have external features, such as rotation and folding.

In devices of the related art, the display device size and viewing mode are relatively fixed, and the display state is also relatively fixed for pictures displayed on the screen. For example, the display size, orientation, and content of the screen wallpaper are constant. However, for a new type of device with characteristics of rotation, folding, and the like, although the state of the device is changed, the picture display still adopts the existing way, for example, if a user sets a photograph as a wallpaper of a folding device, the wallpaper will be cut to be displayed on the cover screen after the device is folded, as shown in FIG. 1. Such a wallpaper display is obviously not user-friendly.

FIG. 1 is a diagram of an existing fixed wallpaper display according to the related art.

Referring to FIG. 1, based on this, a user has a new demand for a new type of device with the characteristics of rotation, folding, and the like, it is desirable that the picture displayed on the screen can be changed correspondingly with the change of the state of the device to adapt to the current updated state of the device. For example, for the folding terminal, it is desirable that the display of the wallpaper picture changes in the screen-open state and the folding state of the terminal.

FIG. 2A is a diagram I of an existing customized wallpaper according to the related art, and FIG. 2B is a diagram II of an existing customized wallpaper according to the related art.

Referring to FIGS. 2A and 2B, at present, in order to achieve the above requirements, a terminal device needs to be customized, and a specific wallpaper theme needs to be customized for various states of the terminal. For example, for a screen that is folded up and down as shown in FIG. 2A, when the screen opens, the screen wallpaper is the flower opening, and when the screen closes, the screen wallpaper is the flower shrinking. Alternatively, for a screen that is folded left and right as shown in FIG. 2B, a butterfly wing incites with the opening and closing of the device. However, the above customization processing has a high implementation cost and a limited number of optional pictures, and cannot generate adaptively a satisfactory latent image according to the state of a terminal device. For example, a self-photographing cannot be dynamically displayed according to the device's characteristics.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for generating a latent image, a computer storage medium, and an electronic device, which can adaptively generate a latent image suitable for a current terminal state according to different states of a terminal device and a basic image.

Additional aspects will be set forth in part in the description which follows and, in part, will be apparent from the description, or may be learned by practice of the presented embodiments.

In accordance with an aspect of the disclosure, a method for generating and displaying a latent image is provided. The method includes acquiring a behavior text vector representing a behavior state of a device and an attribute text vector representing a display attribute of the device, acquiring an image text vector and an image feature element of a basic image, combining vector values of the behavior text vector, the attribute text vector, and the image text vector to obtain a relevant vector combination, the relevant vector combination being a combination including a value of the behavior text vector, a value of the attribute text vector, and a value of the image text vector, inputting all the relevant vector combinations into a pre-trained semantic script generation model for processing to generate a semantic script text for describing latent image generation requirements, inputting the semantic script text and the image feature element into a pre-trained conditional image generation model for processing to generate a latent image corresponding to the behavior state of the device, and displaying the corresponding latent image based on the behavior state of the device.

In an implementation, in the pre-trained semantic script generation model, long short-term memory (LSTM) is performed on each input relevant vector combination, and effective processing results are identified, an attention weight corresponding to each relevant vector combination is generated based on an attention mechanism, and each effective processing result is weighted and fused using the attention weight to obtain the semantic script text.

In an implementation, the identifying of the effective processing results includes determining to be an ineffective processing result if there is no difference in processing results at different times corresponding to the relevant vector combination.

In an implementation, the pre-trained semantic script generation model is a hierarchical attention neural network based on LSTM.

In an implementation, the conditional image generation model is a latent diffusion model, in the conditional image generation model, a target image is generated based on the image feature element, and the semantic script text and the image feature element are fused to obtain a multi-modal vector, a target parameter under the behavior state is generated based on the multi-modal vector, the generated target image is verified and adjusted based on the target parameter to obtain the latent image under the behavior state.

Results generated corresponding to different times are compressed into a latent feature space for learning a representation of the latent image.

In an implementation, in the conditional image generation model, the generated latent image preferentially changes domain-dependent image feature elements indicated by the semantic script text and preferentially remains unchanged for domain-independent image feature elements.

In an implementation, the target parameters under the behavior state include target parameters corresponding to different time states under the behavior state, the latent images under the behavior state include latent images corresponding to different time states under the behavior state, and there are a plurality of latent images corresponding to the behavior state of the device, including latent images corresponding to different time points.

In an implementation, the acquiring of the behavior text vector representing different behavior states of a device includes detecting the different behavior states of the device and generating corresponding behavior text vectors.

In an implementation, the obtaining of the relevant vector combination includes performing relevance filtering on vector value combinations of the behavior text vector, the attribute text vector, and the image text vector to obtain a plurality of vector value combinations with relevance greater than a set threshold as the relevant vector combination, each vector value combination being a combination including the value of the behavior text vector, the value of the attribute text vector, and the value of the image text vector.

In an implementation, the performing of the relevance filtering on vector value combinations of the behavior text vector, the attribute text vector, and the image text vector includes calculating, for each vector value combination, a pointwise mutual information (PMI) value between two-word vector values in the combination, and calculating a sum of the PMI values as the relevance of the vector value combination.

In accordance with another aspect of the disclosure, an apparatus for generating and displaying a latent image is provided. The apparatus includes a state and attribute acquisition device, a basic image processor, a filter, a semantic script generation model processor, a conditional image generation model processor, and a display, wherein the state and attribute acquisition device is configured to acquire a behavior text vector representing different behavior states of a device and an attribute text vector representing different display attributes of the device, wherein the basic image processor is configured to acquire an image text vector and an image feature element of a basic image, wherein the filter is configured to combine various vector values of the behavior text vector, the attribute text vector, and the image text vector to obtain a relevant vector combination, the relevant vector combination including a combination including a value of the behavior text vector, a value of the attribute text vector, and a value of the image text vector, wherein the semantic script generation model processor is configured to input all the relevant vector combinations into a pre-trained semantic script generation model for processing to generate a semantic script text for describing latent image generation requirements, wherein the conditional image generation model processor is configured to input the semantic script text and the image feature element into a pre-trained conditional image generation model for processing to generate latent images corresponding to the different behavior states of the device, and wherein the display is configured to display the corresponding latent image based on the behavior state of the device.

In accordance with another aspect of the disclosure, one or more non-transitory computer-readable storage media storing computer-executable instructions that, when executed by one or more processors of an apparatus, cause the apparatus to perform operations are provided. The operations include acquiring a behavior text vector representing a behavior state of a device and an attribute text vector representing a display attribute of the device, acquiring an image text vector and an image feature element of a basic image, combining vector values of the behavior text vector, the attribute text vector, and the image text vector, obtaining a relevant vector combination, the relevant vector combination being a combination including a value of the behavior text vector, a value of the attribute text vector, and a value of the image text vector, inputting all the relevant vector combinations into a pre-trained semantic script generation model for processing to generate a semantic script text for describing latent image generation requirements, inputting the semantic script text and the image feature element into a pre-trained conditional image generation model for processing to generate a latent image corresponding to the behavior state of the device, and displaying the corresponding latent image based on the behavior state of the device.

In accordance with another aspect of the disclosure, an electronic device is provided. The electronic device includes memory storing one or more computer programs, and one or more processors communicatively coupled to the memory, wherein the one or more computer programs include computer-executable instructions that, when executed by the one or more processors, cause the electronic device to acquire a behavior text vector representing a behavior state of a device and an attribute text vector representing a display attribute of the device, acquire an image text vector and an image feature element of a basic image, combine vector values of the behavior text vector, the attribute text vector, and the image text vector, obtaining a relevant vector combination, the relevant vector combination being a combination including a value of the behavior text vector, a value of the attribute text vector, and a value of the image text vector, input all the relevant vector combinations into a pre-trained semantic script generation model for processing to generate a semantic script text for describing latent image generation requirements, input the semantic script text and the image feature element into a pre-trained conditional image generation model for processing to generate a latent image corresponding to the behavior state of the device, and display the corresponding latent image based on the behavior state of the device.

It can be seen from the above technical solutions that the application acquiring a behavior text vector representing a behavior state of a device and an attribute text vector representing a display attribute of the device, acquiring an image text vector and an image feature element of a basic image, combining various vector values of the behavior text vector, the attribute text vector, and the image text vector to obtain a relevant vector combination, these relevant vector combinations representing the combination relationships between various image feature elements and behavior states and attributes of the device, and the need for latent images at various behavior states being subsequently determined based on these combinations, inputting all the relevant vector combinations into a pre-trained semantic script generation model for processing to generate a semantic script text for describing latent image generation requirements, inputting the semantic script text and the image feature element into a pre-trained conditional image generation model for processing, and modifying and recombining the image feature element according to the requirements described by the semantic script text to generate a latent image corresponding to the behavior state of the device, and displaying the corresponding latent image based on the behavior state of the device. A latent image that is suitable for the current terminal state can be adaptively generated according to the different states of the terminal device and the basic image through the above processing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
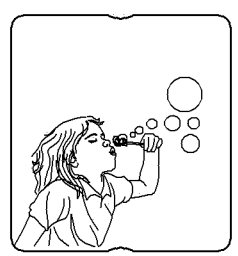
FIG. 1 is a diagram of an existing fixed wallpaper display according to the related art.
Figure 1:
Figure 2A:
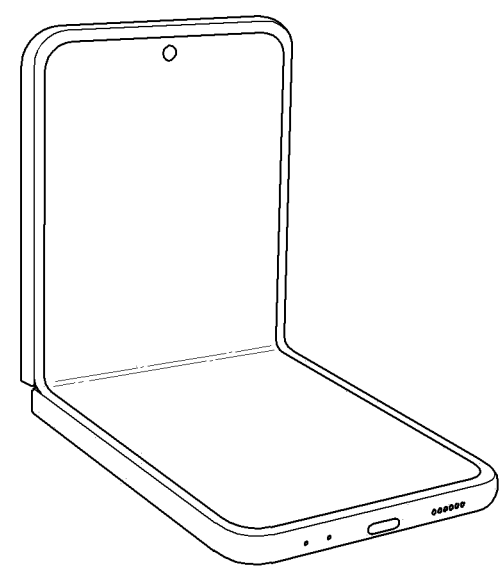
FIG. 2A is a diagram I of an existing customized wallpaper according to the related art.
Figure 2B:
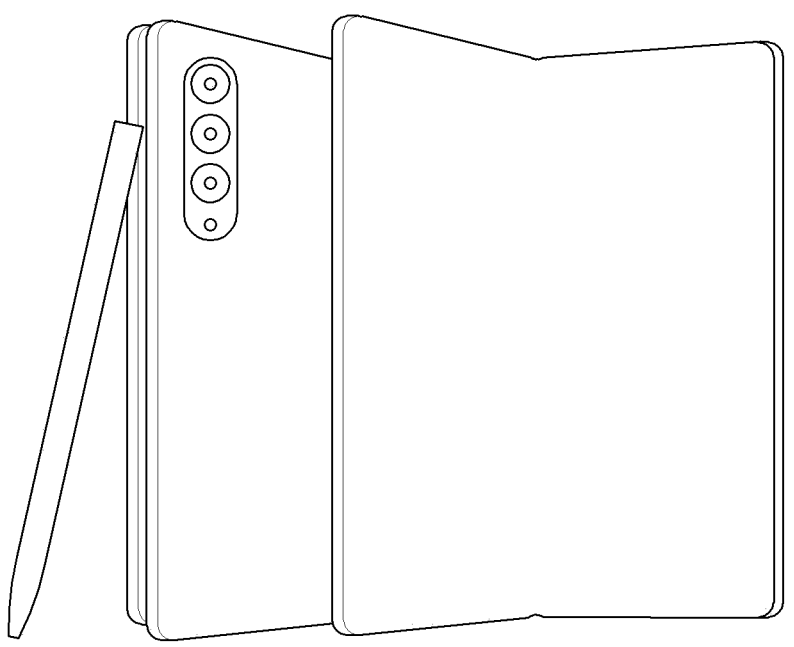
FIG. 2B is a diagram II of an existing customized wallpaper according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The basic idea of the application is as follows: according to the behavior state and attribute information of the device, the text vector and image elements of the basic image are used to adaptively generate the latent image conforming to the different behavior state and attributes of the device through the neural network model.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 3:
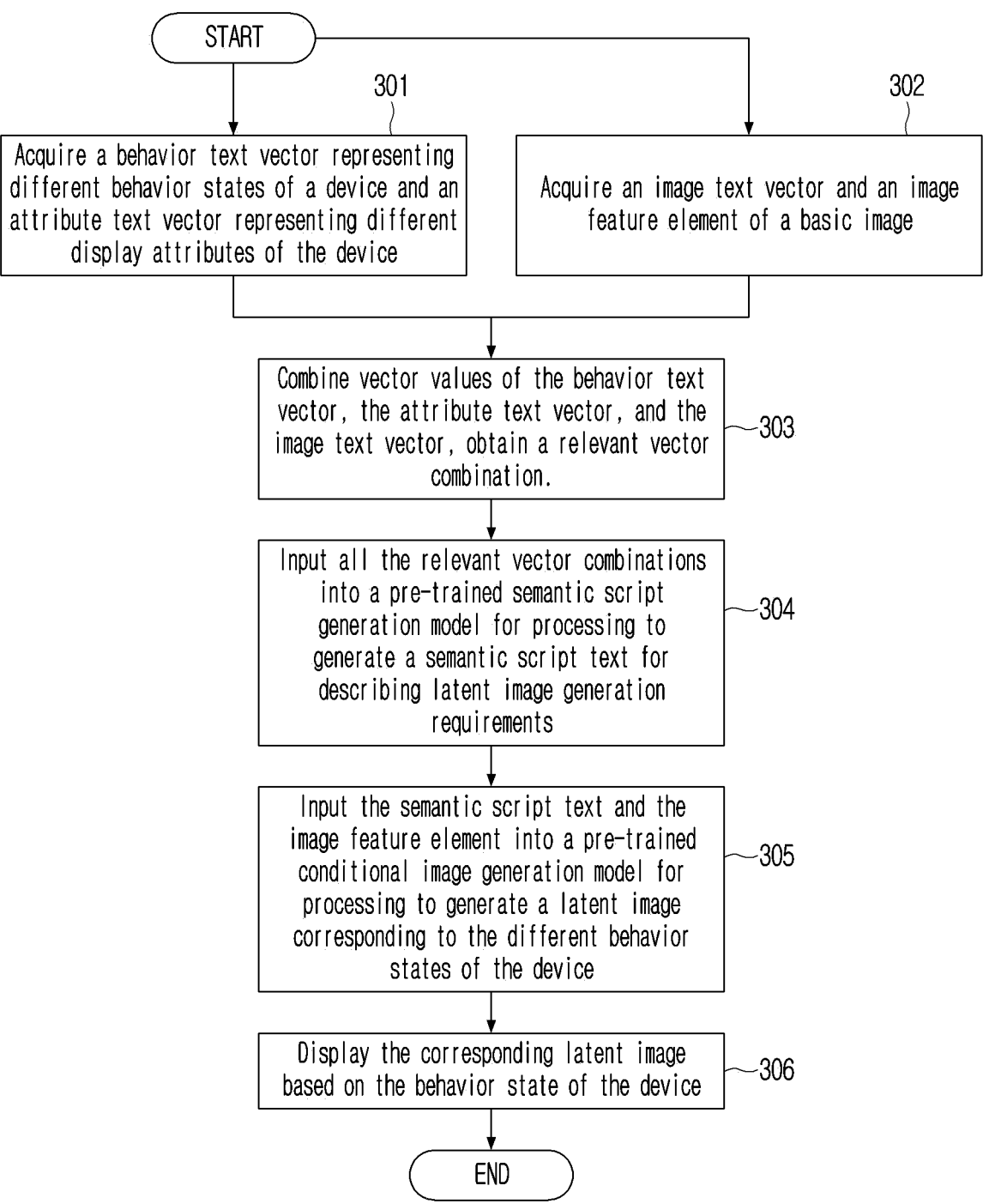
FIG. 3 is a basic flow diagram of a method for generating and displaying a latent image according to an embodiment of the disclosure.

FIG. 3 is a basic flow diagram of a method for generating and displaying a latent image according to an embodiment of the disclosure.

Referring to FIG. 3, the method includes the following operations:

At operation 301, acquire a behavior text vector representing different behavior states of a device and an attribute text vector representing different display attributes of the device.

In order to realize the function of generating latent images adaptively based on the behavior state of the device, firstly, different behavior states of the device need to be acquired. In the application, a text vector is used to characterize different behavior states of a device, and the text vector is referred to as a behavior text vector B, at the same time, it is also necessary to obtain text vectors characterizing different display properties of the device, and the text vectors are referred to as attribute text vectors X, for example, different screen sizes of the device, or rotation angles, rotation speeds of the display screen of the device.

At operation 302, acquire an image text vector and an image feature element of a basic image.

In the application, a basic image set by a user is analyzed to obtain an image feature element and a text vector for describing the image (hereinafter referred to as an image text vector). Image feature elements may be embodied through, such as image segmentation and recognition. The image text vector may also be obtained in a variety of existing ways, for example, by the results of image segmentation and recognition.

The above processes of operations 301 and 302 may be performed in parallel or in any order.

At operation 303, combine vector values of the behavior text vector, the attribute text vector, and the image text vector, obtain a relevant vector combination.

Different values of the behavior text vector represent different behavior states of the device, different values of the attribute text vector represent different display attributes of the device and different values of the image text vector may represent different image feature elements of the basic image. In the application, the value combination of each text vector is a combination of the value of a behavior text vector, the value of an attribute text vector, and the value of an image text vector. The different value combinations of these three types of text vectors represent the combination of different behavior states, different display attributes, and different image feature elements of the device.

In this operation, each value combination of the three types of text vectors is determined as a relevant vector combination for representing various cases of the three types of text vector combinations.

Alternatively, considering the problem of computation power, when determining the relevant vector combination in the operation, it is also possible to determine the relevance of each value combination of the three types of text vectors, and then perform filtering processing based on the relevance result to obtain a value combination of which the relevance exceeds a set threshold as a relevant vector combination for representing various cases of strong relevance of the three types of text vectors. In this case, the vector combinations represent strong relevance combination relationships between various image feature elements and behavior states and attributes of the device and subsequently determine the requirements for latent images in various behavior states based on these strong relevance combinations.

At operation 304, input all the relevant vector combinations into a pre-trained semantic script generation model for processing to generate a semantic script text for describing latent image generation requirements.

In this operation, a neural network model is used to generate semantic script text based on all relevant vector combinations. The semantic script text is used to describe the generation requirements of the latent image, that is, what requirements should be met for the latent image to be generated. The generation requirements of the latent image correspond to different behavior states and attribute combinations of the device to direct the generation of latent images corresponding to different behavior states of the device.

The neural network model used in the operation is a pre-trained semantic script generation model. Alternatively, the model may be a hierarchical attention neural network based on LSTM, with two salient features:

a. The hierarchical structure of words and sentences can be reflected.

b. The attention mechanism is a long-term memory mechanism, which can intuitively give each word's contribution or sentence's result. It has two levels of attention mechanism applied in word and sentence level, so that more and more important content can be noticed when constructing semantic script representation.

More particularly, in the semantic script generation model, LSTM is performed on each input relevant vector combination, and effective processing results are identified, an attention weight corresponding to each relevant vector combination is generated based on an attention mechanism, and each effective processing result is weighted and fused by using the attention weight to obtain the semantic script text. In identifying effective processing results, if there is no difference in processing results corresponding to the relevant vector combination at different times, it is determined to be an ineffective processing result.

In this way, on the one hand, the feature attributes related to the time sequence can be determined for each relevant vector combination using the LSTM, and the feature states in a long time and a short time can be specifically determined, on the other hand, the hierarchical attention mechanism is used to allocate appropriate attention weight for each relevant vector combination, so that more attention is paid to the more important relevance vector combinations when generating the semantic script text, that is to say, the latent image generation requirement reflects more important relevant vector combination.

At operation 305, input the semantic script text and the image feature element into a pre-trained conditional image generation model for processing to generate a latent image corresponding to the different behavior states of the device.

In this operation, a neural network model is used to generate latent images that adapt to different behavior states of the device.

Specifically, the neural network model used in the operation is a pre-trained conditional image generation model, mainly including a latent diffusion model. The latent diffusion model serves as a generating model, whose purpose is to describe its basic data distribution, and the model parameters are estimated by minimizing the difference between the actual and generated data distributions. In the application, the processing is performed using a latent diffusion model, and the result generated in each operation is compressed into a high-quality latent feature space, a latent representation is learned, and each image feature element of a basic image is modified and recombined according to the requirements described by a semantic script text, to generate a latent image corresponding to a behavior state of the device. Specifically, in the conditional image generation model, a target image is generated based on the image feature element, and the semantic script text and the image feature element are fused to obtain a multi-modal vector, a target parameter under the behavior state is generated based on the multi-modal vector, the generated target image is verified and adjusted based on the target parameter to obtain the latent image under the behavior state which meets the verification requirements. Target parameters in a behavior state of the device may be a group, and a latent image in a corresponding behavior state of the device may be one and may be displayed as a static image, alternatively, the target parameters in the behavior state of the device may be a plurality of groups corresponding to different time states, and the latent images in the corresponding behavior state of the device may also be a plurality of images corresponding to different time states, and may be displayed as dynamic images.

In addition, in the conditional image generation model, the generated latent image may preferentially change the domain-dependent image feature elements indicated by the semantic script text and preferentially remain unchanged for the corresponding domain-independent image feature elements.

Figure 4A:
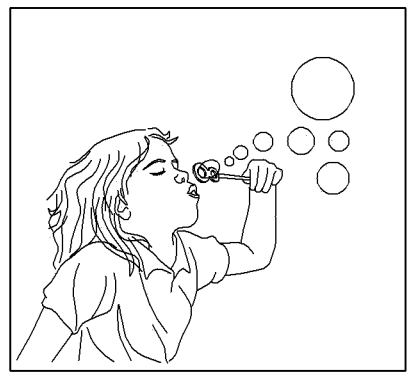
FIGS. 4A and 4B are diagrams of a basic image and a corresponding latent image according to various embodiments of the disclosure.
Figure 4B:
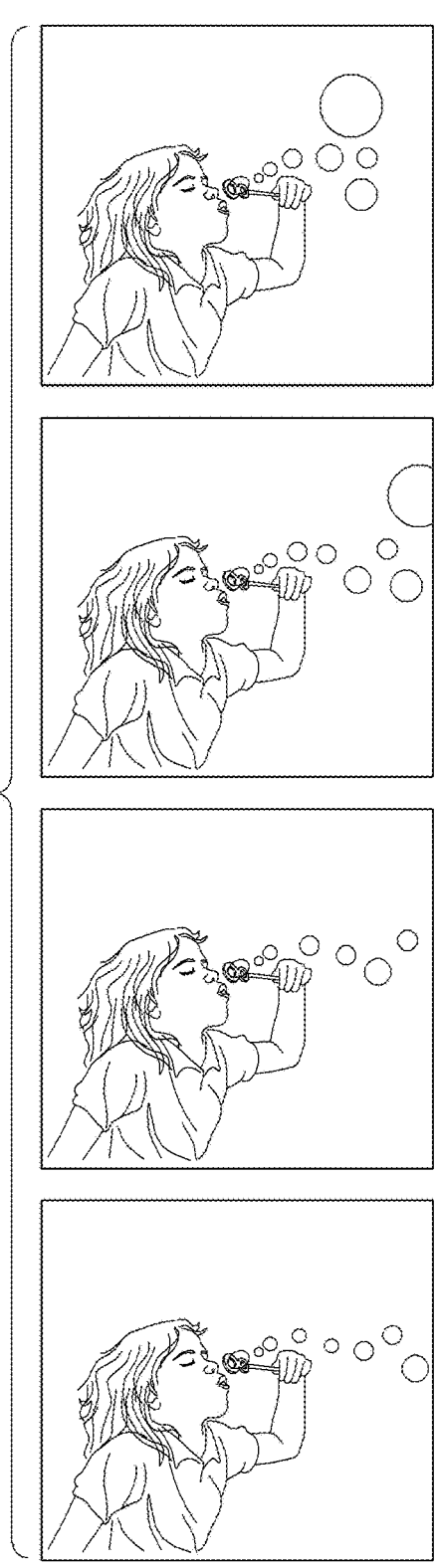

FIGS. 4A and 4B are diagrams of a basic image and a corresponding latent image according to various embodiments of the disclosure.

Referring to FIGS. 4A and 4B, FIG. 4A is a basic image, image feature elements thereof include a child's head, arm, body, bubble, background forest, color, and the like. FIG. 4B is a generated plurality of latent images, as shown in FIG. 4B, when generating these latent images, the child's arm is gradually closed, domain-dependent image feature elements including the child's head, arm, and the like can be analyzed through semantic script text, and when generating the latent images, these image feature elements are preferentially modified, domain-independent image feature elements include background forest, body, color, and the like. The priority processing method for these image feature elements in generating a latent image remains unchanged.

At operation 306, display the corresponding latent image based on the behavior state of the device.

By processing of the foregoing operations, a latent image corresponding to the behavior state of the device can be generated, and the operation displays the corresponding latent image based on the behavior state of the current device.

The previously generated latent image corresponding to a behavior state of the device may be one or a plurality of latent images arranged in a time sequence and may be displayed as a video image, such as dynamic wallpaper.

At this point, the flow of the method for generating and displaying a latent image in the application ends. It can be seen from the above that the application can use an image feature element of a basic image to perform modification and recombination in combination with a state and a display attribute of the device to adaptively generate a latent image matching the state and the display attribute of the device.

Specific implementations of the application are illustrated below by specific embodiments.

Figure 5:
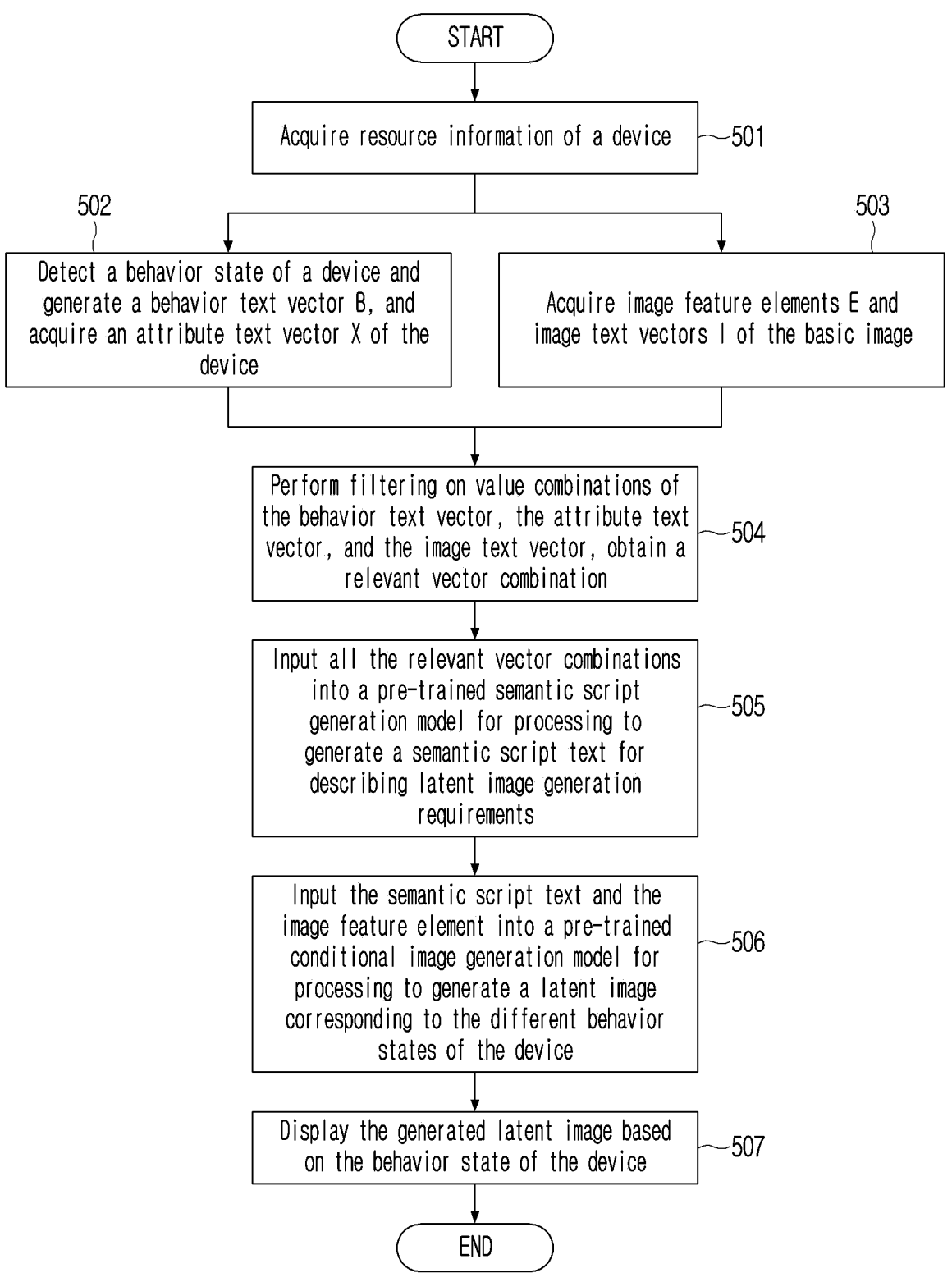
FIG. 5 is a flow diagram of a method for generating and displaying a latent image according to an embodiment of the disclosure.

FIG. 5 is a flow diagram of a method for generating and displaying a latent image according to an embodiment of the disclosure.

Figure 6:
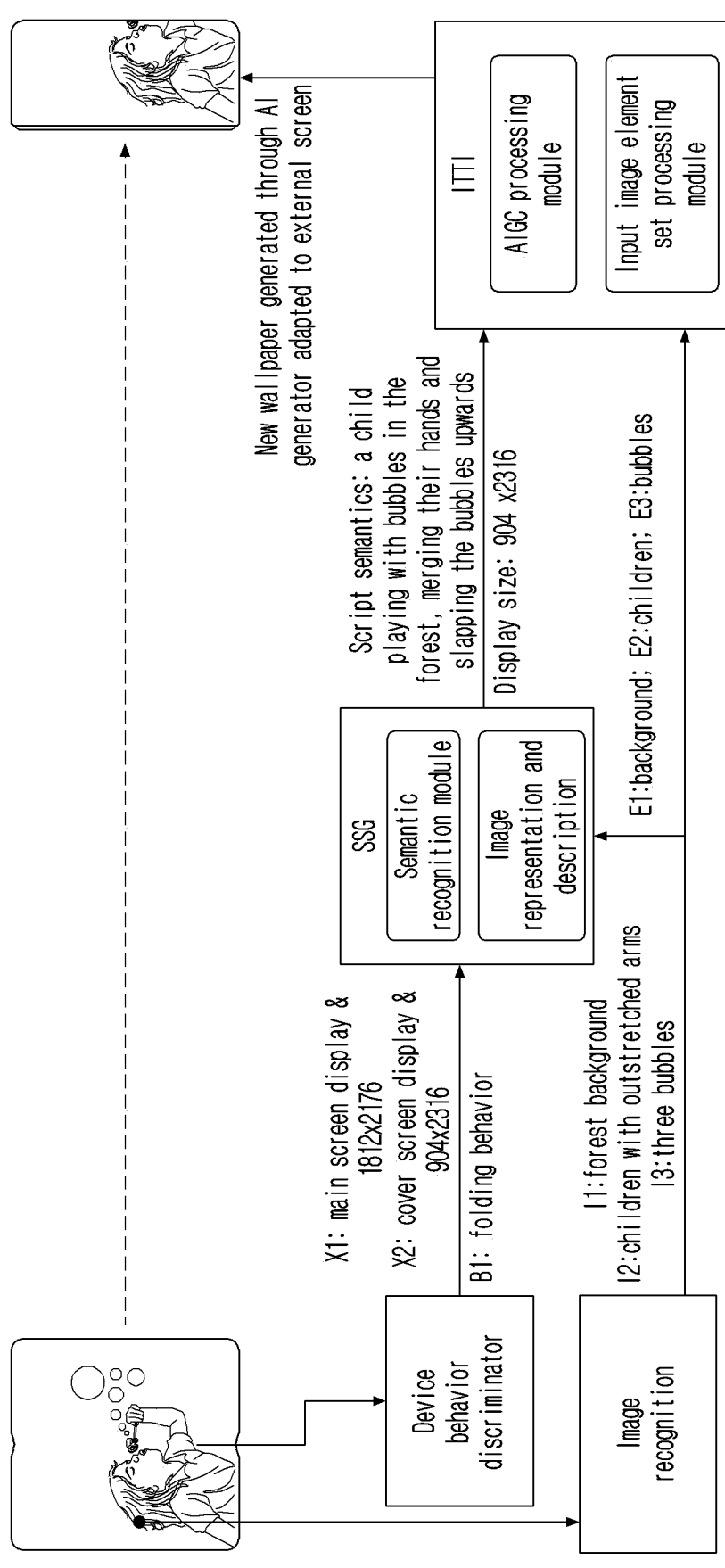
FIG. 6 is a flow framework diagram of a method for generating and displaying a latent image with the basic image and corresponding latent image shown in FIGS. 4A and 4B as an example according to an embodiment of the disclosure.

FIG. 6 is a flow framework diagram of a method for generating and displaying a latent image with the basic image generating a latent image shown in FIGS. 4A and 4B according to an embodiment of the disclosure.

Referring to FIGS. 5 and 6, the method of the embodiment specifically includes the following operations:

At operation 501, acquire resource information of a device.

The user can start the corresponding function before latent image generation is required, for example, the user sets a new wallpaper in the folding device and opens the generation function of the artificial intelligence wallpaper.

At operation 502, detect a behavior state of a device and generate a behavior text vector B, and acquire an attribute text vector X of the device.

In the embodiment of the disclosure, a corresponding latent image is generated for display by real-time detection of a currently occurring behavior state of the device. Of course, in other specific implementation methods, various types of behavior states of a device can also be acquired through various types of device operations in advance, a corresponding latent image is generated and saved, and when the device is in a new behavior state due to a certain operation, the saved latent image corresponding to the new behavior state is displayed.

In the embodiment of the disclosure, assuming that the occurring behavior state is a mobile phone folding operation, a behavior text vector $B_1$ is correspondingly generated, for example, folding, standing, and unfolding, the display attributes of the acquisition device are the main display size and the cover display size, 1812*2176 and 904*2316, respectively, corresponding to the attribute text vectors $X_1$ and $X_2$. The operation can be implemented in the device behavior discriminator shown in FIG. 6.

At operation 503, acquire image feature elements E and image text vectors I of the basic image.

In the embodiment of the disclosure, the processing of the operation is implemented by a visual encoder and decoder model, and in particular the image recognition portion in FIG. 6. The visual encoder performs segmentation and recognition on the basic image to obtain image feature elements and generates an image text vector corresponding to the image feature elements through a decoder (such as an autoregressive language model). As shown in FIG. 6, the acquired image feature elements include an image $E_1$ of a background number portion, an image $E_2$ of a child portion, and an image $E_3$ of a bubble portion, and the acquired image text vectors include $I_1$, $I_2$, and $I_3$. $I_1$ represents a background forest, $I_2$ represents a child with open arms, and $I_3$ represents 3 bubbles.

The above processing of operations 502 and 503 are performed after operation 501 and before operation 504, and operations 502 and 503 may be performed in parallel or in any order.

At operation 504, perform filtering on value combinations of the behavior text vector, the attribute text vector, and the image text vector, obtain a relevant vector combination.

In this operation, all the acquired behavior text vectors, attribute text vectors, and image text vectors are input into a filter.

Figure 7:
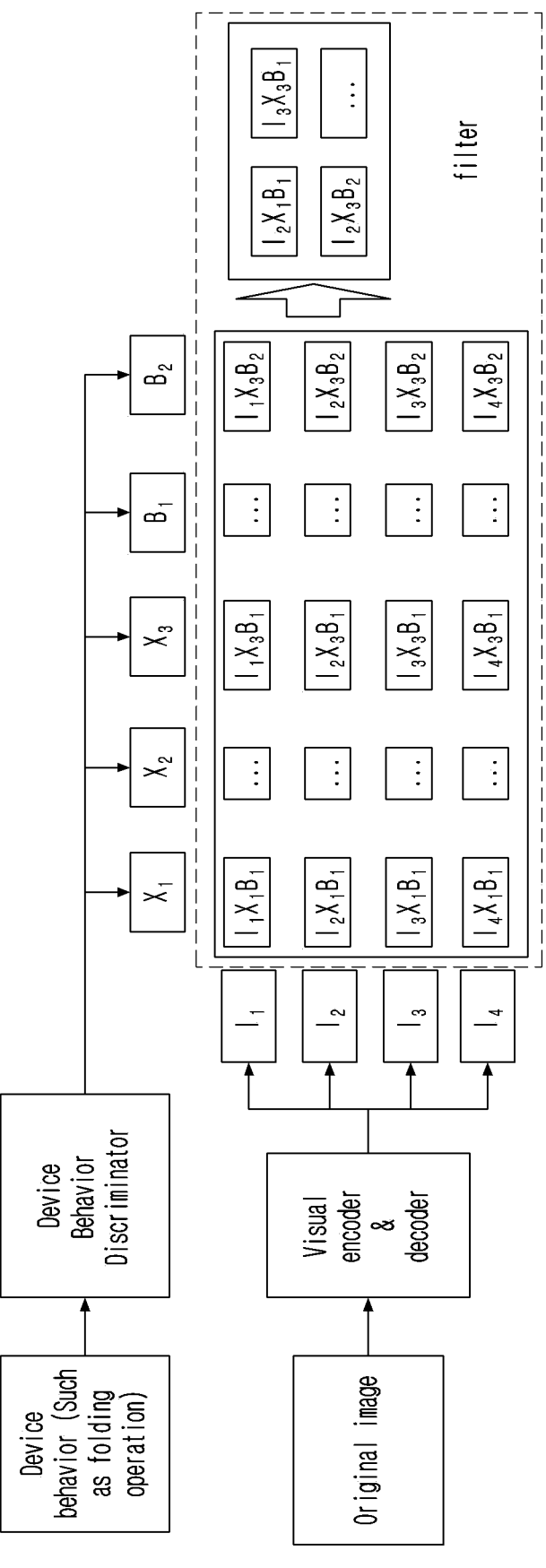
FIG. 7 is a processing diagram of a filter according to an embodiment of the disclosure.

FIG. 7 is a processing diagram of a filter according to an embodiment of the disclosure.

Referring to FIG. 7, the filter performs a combination of different values for all the inputs, each combination includes the values of three text vectors, and the three text vectors belong to different text vector categories, for each combination, the relevance of the three text vector values is determined, and a combination with a relevance higher than a set threshold is selected from all combinations, namely, a combination with a high relevance is filtered out. In a specific implementation, the filter may be based on point mutual information PMI and a value among word vectors in a word vector combination to calculate relevance or trend change convergence, the larger the PMI and the value are, the stronger the relevance is, and a corresponding word vector is filtered according to a set threshold. The PMI value is the sum of PMI values between two-word vector values in a word vector combination, PMI $(word_1, word_2)=P(word_1 \& word_2)$, $$PMI_{sum} = \sum_i PMI_i,$$

P is a phrase relevance input model preset according to device attributes, which collects and trains the convergence distribution of various things under the change of known attributes of the device. In the application, the word vector combination in the filter is the value of three text vectors.

At operation 505, input all the relevant vector combinations into a pre-trained semantic script generation model for processing to generate a semantic script text for describing latent image generation requirements.

As previously mentioned, the semantic script generation model is a hierarchical attention neural network based on LSTM. The training samples are used to train various parameters of the neural network to generate a semantic script generation model. In the operation, all the input relevant vector combinations are processed using the semantic script generation model to generate a semantic script text.

Figure 8:
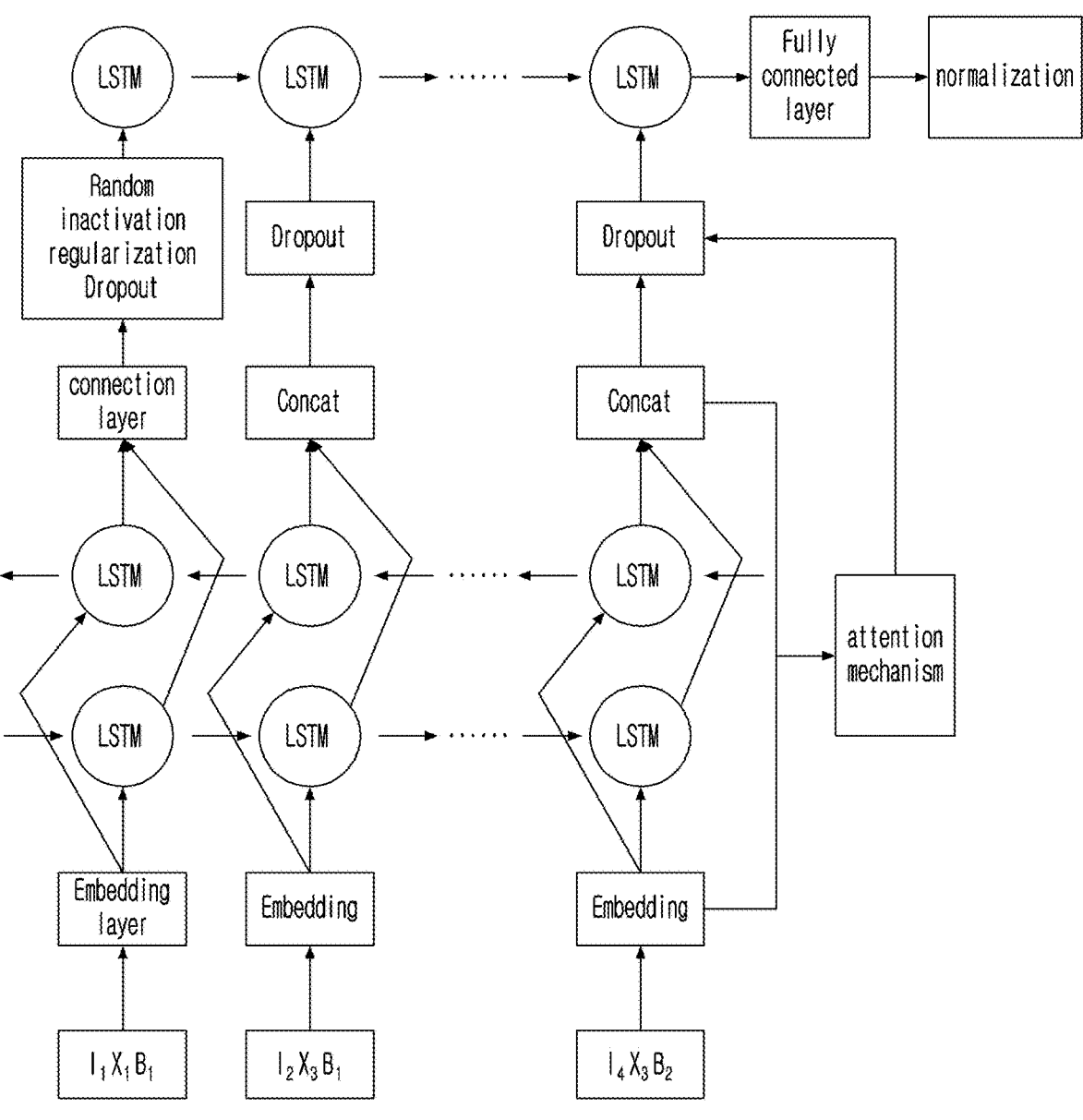
FIG. 8 is a structural diagram of a semantic script generation model according to an embodiment of the disclosure.

FIG. 8 is a structural diagram of a semantic script generation model according to an embodiment of the disclosure.

Referring to FIG. 8, in the embodiment of the disclosure, a structural example structured skip-gram (SSG) of a semantic script generation model is given. All relevant vector combinations are input into a SSG model, and the SSG model includes a plurality of identical branch models, and each branch model is used for processing one relevant vector combination. In each branch model, an embedding layer processing is firstly performed on an input relevant vector combination to obtain an embedded feature, and then the LSTM processing of different time levels is performed to reflect the state or degree of the embedded feature changing with time, and after the LSTM processing results of various time levels are combined, validity judgment of the processing results is performed through dropout processing to identify effective processing results therein (dropout is generally used in a training and learning stage to prevent over-fitting and reduce errors). The result that the state or degree of change over time is not obvious can be determined as an ineffective processing result, and the other can be determined as an effective processing result. At the same time, attention mechanism processing is used to obtain an attention weight corresponding to each relevant vector combination. Each effective processing result and its corresponding attention weight are used to perform weighting and fusion, to finally obtain a latent image generation requirement corresponding to a behavior state of the device, and to use a text representation, namely, a semantic script text.

In addition, in the training of the semantic script generation model, softmax is used to compare the predicted semantic script text with the actual script text to obtain the result of the loss function, and each parameter of the model is adjusted in reverse based on the result until the completion condition of the model training is satisfied.

At operation 506, input the semantic script text and the image feature element into a pre-trained conditional image generation model for processing to generate a latent image corresponding to the different behavior states of the device.

As described above, the conditional image generation model mainly includes a latent diffusion model, which is also a neural network model. The training samples are used to train various parameters of the neural network in advance to generate the conditional image generation model. In this operation, the conditional image generation model is used to modify and recombine the input image feature elements according to the latent image generation requirements expressed by the input semantic script text to generate the latent image corresponding to the behavior state of the device.

Figure 9:
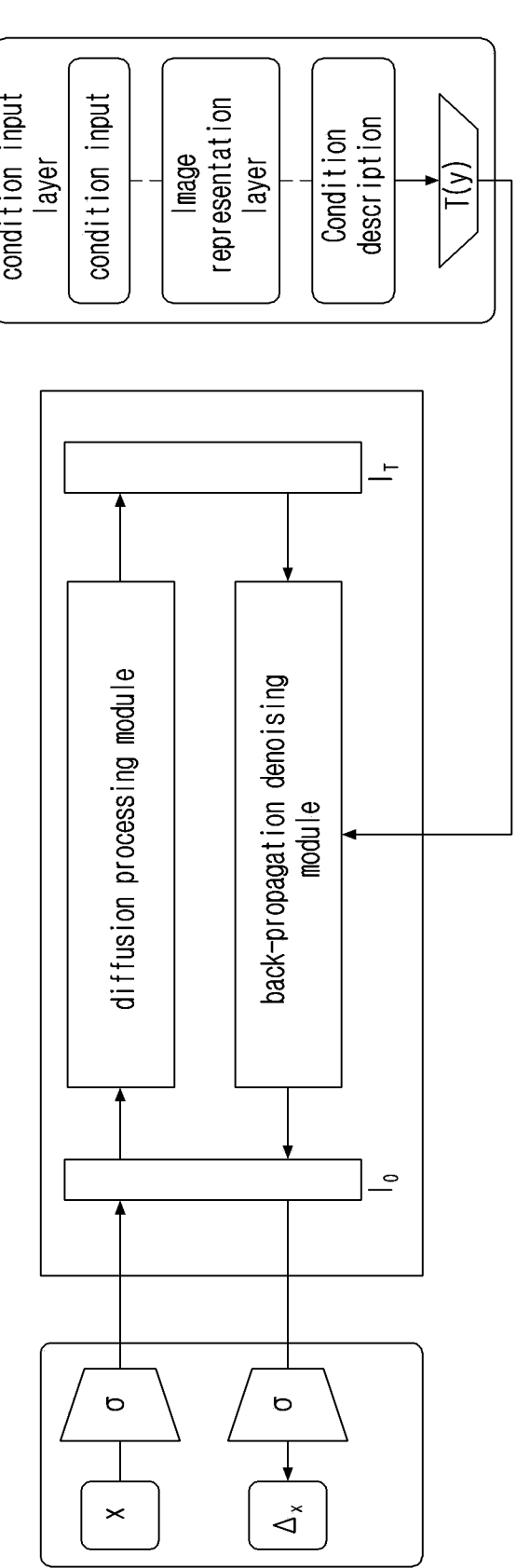
FIG. 9 is a structural diagram of a conditional image generation model according to an embodiment of the disclosure.

FIG. 9 is a structural diagram of a conditional image generation model according to an embodiment of the disclosure.

Referring to FIG. 9, in the embodiment of the disclosure, a structural example information theory-based visual attention (ITTI) of the conditional image generation model is given. The model includes a diffusion processing module, a condition input layer, and a back-propagation denoising module, and the functions specifically realized include: the diffusion processing module is configured to generate an image and specifically able to continuously adjust the pixel value in the generated image according to the partial differential equation in the back-propagation denoising module so that the pixel value gradually tends towards the target image, the condition input layer is configured to fuse text features and image features in a semantic operation text to obtain a multi-modal vector and generate a target parameter (namely, T (y)) in a certain state according to a predicted semantic script pair, the back-propagation denoising module is configured to describe the propagation process of materials in images and calculate the verification and adjustment of images generated by diffusion processing module in the current state.

In addition, in the conditional image generation model, specific domain-dependent features (specific parts such as head and arm) given in the semantic footstep text are preferentially modified (that is, modified as much as possible) while domain-independent features (for example, background, color, and body) remain.

The latent image generated by the conditional image generation model corresponds to a particular behavior state of the device, which in the embodiment corresponds to $B_1$. At the same time, the latent image corresponding to the behavior state of the device may be one or may be a plurality of latent images arranged in chronological order, as shown in FIGS. 4A and 4B.

Figure 10:
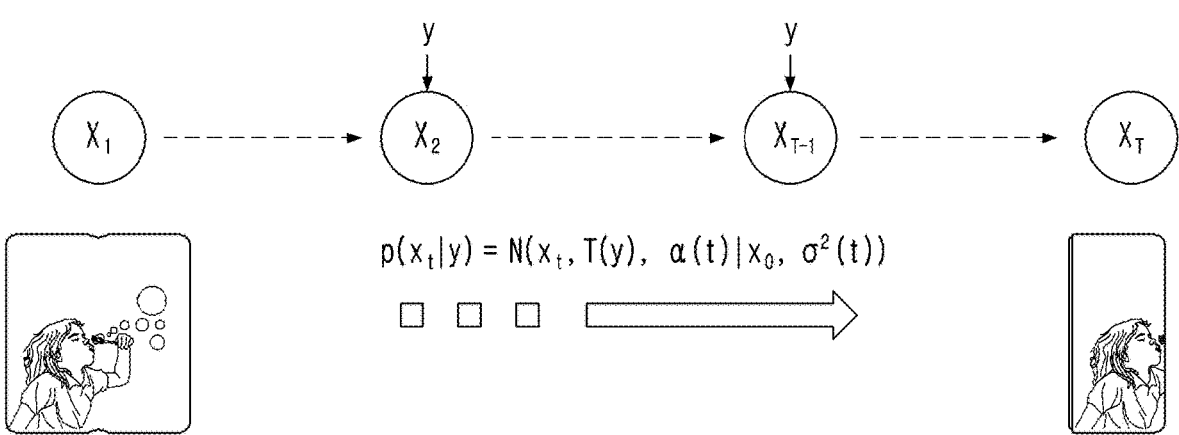
FIG. 10 is a diagram of a latent image generation process according to an embodiment of the disclosure.

FIG. 10 is a diagram of a latent image generation process according to an embodiment of the disclosure.

Referring to FIG. 10, when a plurality of latent images arranged in chronological order is generated, the generation process of the latent images can be represented by the formula in FIG. 10, $X_1$ to $X_T$ represent the transition process of the state space from one state to another state, y represents the input condition data, and T(y) represents the posterior probability obtained after adding the condition data in each time step t, $\alpha(t)$ represents the relevance coefficient of the current state in the state process, the higher the coefficient, the closer to the target image, $\sigma^2(t)$ is the hyper-parameter of the variance of Gaussian distribution, N represents the Markov chain calculation process, and $p(x_t|y)$ represents the output of a state in the state space. The picture located on the left side in FIG. 10 is the original image, and the picture located on the right side is the target image correspondingly generated at the time $X_T$.

At operation 507, display the generated latent image based on the behavior state of the device.

A correspondingly generated latent image, such as the child's arm closed image given in FIG. 6, is displayed depending on the current behavior state of the device.

This concludes the method flow in the embodiment.

The embodiments described above give a specific example of generating a latent image, and in fact, a latent image may also be generated adaptively corresponding to a plurality of behavior states of the device by using the method of the application.

Figure 11:
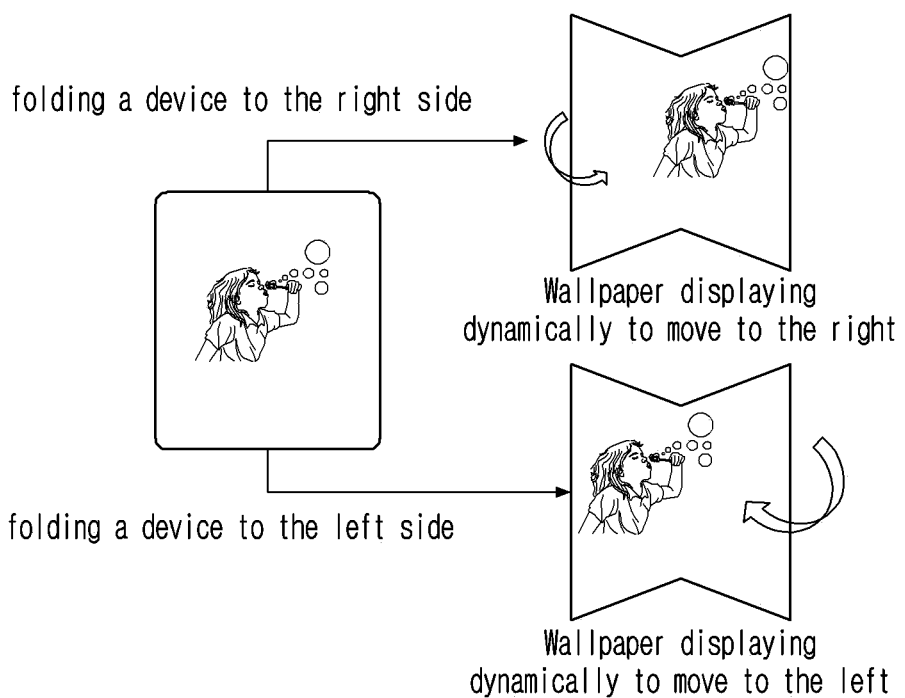
FIG. 11 is a diagram I of latent image generation and display by a method according to an embodiment of the disclosure.

FIG. 11 is a diagram I of latent image generation and display by a method according to an embodiment of the disclosure.

Referring to FIG. 11, for a basic image on the left side, after detecting the behavior state of folding a device to the right side, a plurality of latent images arranged in chronological order can be generated and displayed by the above method, and visually displayed as the main object in the images gradually moves to the right, after detecting the behavior state of folding the device to the left side, a plurality of latent images arranged in chronological order can be generated and displayed by the above method, and visually displayed as the main object in the image gradually moves to the left.

Figure 12:
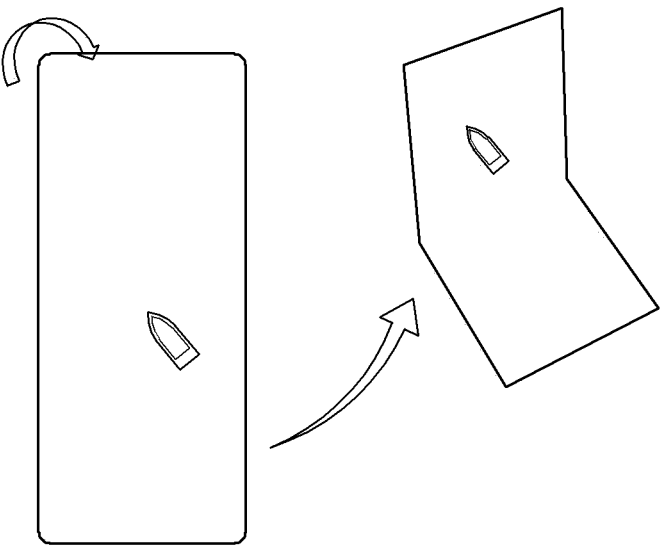
FIG. 12 is a diagram II of latent image generation and display by a method according to an embodiment of the disclosure.

FIG. 12 is a diagram II of latent image generation and display by a method according to an embodiment of the disclosure.

Referring to FIG. 12, for the basic image on the left side, the operation of folding the cellular phone up and down is detected, and the latent image generated by the above method is visually displayed as the boat moving up and down with the folding action.

Figure 13:
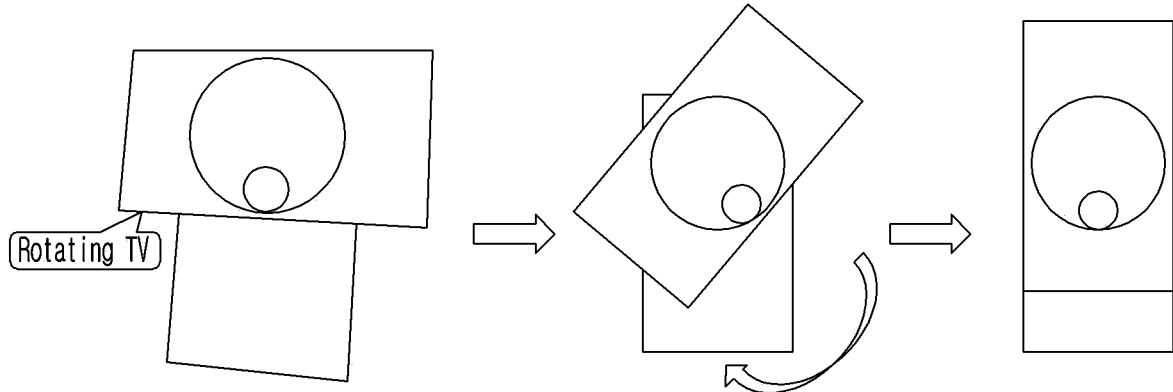
FIG. 13 is a diagram III of latent image generation and display by a method according to an embodiment of the disclosure.

FIG. 13 is a diagram III of latent image generation and display by a method according to an embodiment of the disclosure.

Referring to FIG. 13, for a static wallpaper of a rotating television set, feature elements of a basic image can be extracted by the method of the application mentioned above, and a plurality of latent images are generated to constitute an animation wallpaper in combination with the rotation attribute of a device, and the ball scrolls as the screen rotates.

The above is the specific implementation of the method for generating and displaying a latent image in the application. Through the above method of the application, a matching latent image can be adaptively generated and displayed in combination with the behavior state and attribute information of the device, which can satisfy the user's requirement for image change as the device state changes, without needing to customize an image according to a terminal, enriching the user's image selection and providing a better experience for the user.

The application also provides an apparatus for generating and displaying a latent image that may be used to implement the methods of the application described above.

Figure 14:
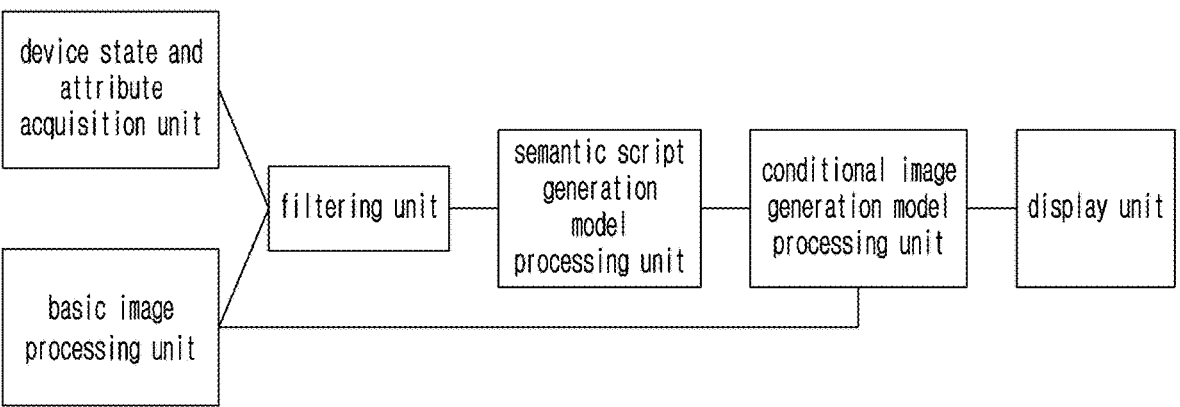
FIG. 14 is a basic structural diagram of an apparatus for generating and displaying a latent image according to an embodiment of the disclosure.

FIG. 14 is a basic structural diagram of the apparatus according to an embodiment of the disclosure.

Referring to FIG. 14, the apparatus includes a state and attribute acquisition device, a basic image processor, a filter, a semantic script generation model processor, a conditional image generation model processor, and a display.

The state and attribute acquisition device is configured to acquire a behavior text vector representing different behav-ior states of a device and an attribute text vector representing different display attributes of the device.

The basic image processor is configured to acquire an image text vector and an image feature element of a basic image.

The filter is configured to combine various vector values of the behavior text vector, the attribute text vector, and the image text vector to obtain a relevant vector combination. The relevant vector combination includes a combination including a value of the behavior text vector, a value of the attribute text vector, and a value of the image text vector.

The semantic script generation model processor is configured to input all the relevant vector combinations into a pre-trained semantic script generation model for processing to generate a semantic script text for describing latent image generation requirements.

The conditional image generation model processor is configured to input the semantic script text and the image feature element into a pre-trained conditional image generation model for processing to generate a latent image corresponding to the different behavior states of the device.

The display is configured to display the corresponding latent image based on the behavior state of the device.

The application also provides one or more non-transitory computer-readable storage media storing computer-executable instructions that, when executed by one or more processors of an apparatus, cause the electronic device to perform operations in the above method for generating and displaying a latent image. In practical applications, the one or more non-transitory computer-readable media may be included in each device/apparatus/system of the above embodiments or may be separate and not incorporated into the device/apparatus/system. Instructions are stored in a computer-readable storage medium, the stored instructions, when executed by a processor, may perform the steps in the above method for generating and displaying a latent image.

According to the embodiments disclosed in the application, the one or more non-transitory computer-readable storage media may be a non-volatile computer-readable storage media, for example, may include, but is not limited to a portable computer diskette, hard disk, random-access memory (RAM), read-only memory (ROM), erasable programmable read-only memory (EPROM or flash memory), portable compact disk read-only memory (CD-ROM), optical storage device, magnetic storage device, or any suitable combination of the above, which is not intended to limit the scope of protection of the application. In the embodiments disclosed in the application, a computer-readable storage medium may be any tangible medium that contains or stores a program that can be used by or in connection with an instruction execution system, apparatus, or device.

Figure 15:
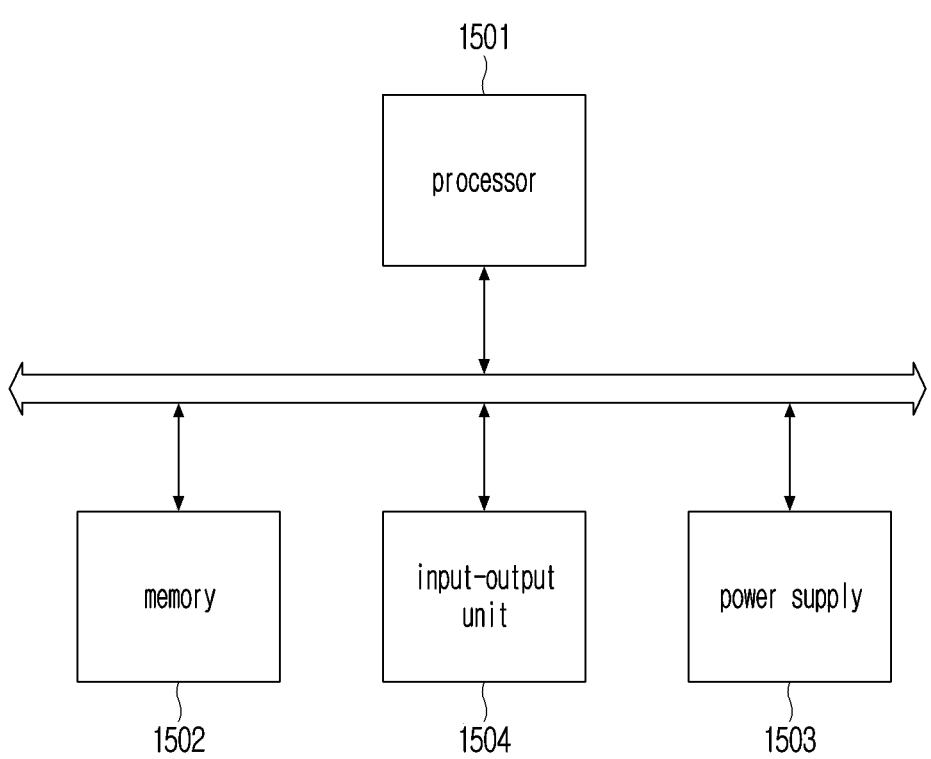
FIG. 15 is a basic structural diagram of an electronic device provided according to an embodiment of the disclosure.

FIG. 15 is an electronic device provided according to an embodiment of the disclosure. FIG. 15 illustrates a structural diagram of the electronic device according to an embodiment of the application, specifically:

Referring to FIG. 15, the electronic device may include a processor 1501 of one or more processing cores, memory 1502 of one or more computer-readable storage media, and a computer program stored on the memory and executable on the processor. In executing the program of the memory 1502, a method for generating and displaying a latent image can be implemented.

Specifically, in practical applications, the electronic device may further include a power supply 1503, an input-output unit 1504, and the like. It will be understood by the skilled in the art that the structure of the electronic device shown in FIG. 15 is not limiting of the electronic device and may include more or fewer components than shown, or some components may be combined, or a different arrangement of components.

The processor 1501 is the control center of the electronic device, connecting various portions of the entire electronic device with various interfaces and lines, performing various functions of the server, and processing data by running or executing software programs and/or modules stored in the memory 1502 and calling data stored in the memory 1502, to monitor the electronic device as a whole.

The memory 1502 can be configured to store software programs and modules, that is, the above computer-readable storage media. The processor 1501 performs various functional applications and data processing by running software programs and modules stored in the memory 1502. The memory 1502 may mainly include a storage program area and a storage data area. The storage program area may store an operating system, an application program required by at least one function, and the like. The storage data area may store data created according to the use of the server, and the like. In addition, the memory 1502 may include high-speed random-access memory, and may also include non-volatile memory, such as at least one magnetic disk storage device, a flash device, or other volatile solid-state storage device. Accordingly, the memory 1502 may also include memory controller to provide access to the memory 1502 by the processor 1501.

The electronic device also includes a power supply 1503 for powering the various components, which may be logically connected to the processor 1501 through a power management system, such that charging, discharging, and power consumption management functions are managed through the power management system. The power supply 1503 may also include any one or more of a direct or alternating current power source, a recharging system, a power failure detection circuit, a power converter or inverter, a power status indicator, and the like.

The electronic device may further include an input-output unit 1504, and the input-output unit 1504 may be configured to receive input numeric or character information and to generate keyboard, mouse, joystick, and optical signal input related to user settings and function control. The input-output unit 1504 may also be configured to display information input by or provided to a user as well as various graphical user interfaces that may be including graphics, text, icons, video, and any combination thereof.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generating and displaying a latent image, the method comprising:

acquiring a behavior text vector representing a behavior state of a device and an attribute text vector representing a display attribute of the device;

acquiring an image text vector and an image feature element of a basic image;

combining vector values of the behavior text vector, the attribute text vector, and the image text vector to obtain a relevant vector combination, the relevant vector combination being a combination including a value of the behavior text vector, a value of the attribute text vector, and a value of the image text vector;

inputting all the relevant vector combinations into a pre-trained semantic script generation model for processing to generate a semantic script text for describing latent image generation requirements;

inputting the semantic script text and the image feature element into a pre-trained conditional image generation model for processing to generate a latent image corresponding to the behavior state of the device; and displaying the corresponding latent image based on the behavior state of the device.

2. The method of claim 1, further comprising:

in the pre-trained semantic script generation model, performing processing of long short-term memory (LSTM) on each input relevant vector combination, and identifying effective processing results;

generating an attention weight corresponding to each relevant vector combination based on an attention mechanism; and weighting and fusing each effective processing result by the attention weight to obtain the semantic script text.

3. The method of claim 2, wherein the identifying of the effective processing results comprises determining an ineffective processing result if there is no difference in processing results at different times corresponding to the relevant vector combination.

4. The method of claim 1, wherein the pre-trained semantic script generation model is a hierarchical attention neural network based on LSTM.

5. The method of claim 1, wherein the pre-trained conditional image generation model is a latent diffusion model, wherein, in the pre-trained conditional image generation model, a target image is generated based on the image feature element, and the semantic script text and the image feature element are fused to obtain a multi-modal vector, wherein a target parameter in the behavior state is generated based on the multi-modal vector, wherein the generated target image is verified and adjusted based on the target parameter to obtain the latent image in the behavior state, and wherein results generated corresponding to different times are compressed into a latent feature space for learning a representation of the latent image.

6. The method of claim 1, wherein in the pre-trained conditional image generation model, the generated latent image preferentially changes domain-dependent image feature elements indicated by the semantic script text and preferentially remain unchanged for domain-independent image feature elements.

7. The method of claim 5, wherein the target parameter in the behavior state comprise target parameters corresponding to different time states under the behavior state, wherein the latent images in the behavior state comprise latent images corresponding to different time states under the behavior state, and wherein there are a plurality of latent images corresponding to the behavior state of the device, comprising latent images corresponding to different time points.

8. The method of claim 1, wherein the acquiring of the behavior text vector representing different behavior states of a device comprises:

detecting the different behavior states of the device; and generating corresponding behavior text vectors.

9. The method of claim 1, wherein obtaining of the relevant vector combination comprises:

performing relevance filtering on vector value combinations of the behavior text vector, the attribute text vector, and the image text vector to obtain a plurality of vector value combinations with a relevance greater than a set threshold as the relevant vector combination, each vector value combination being a combination including the value of the behavior text vector, the value of the attribute text vector, and the value of the image text vector.

10. The method of claim 9, wherein the performing of relevance filtering on vector value combinations of the behavior text vector, the attribute text vector, and the image text vector comprises:

calculating, for each vector value combination, a pointwise mutual information (PMI) value between two-word vector values in the vector value combination; and calculating a sum of the PMI values as relevance of the vector value combination.

11. An apparatus for generating and displaying a latent image, the apparatus comprising:

a state and attribute acquisition device, a basic image processor, a filter, a semantic script generation model processor, a conditional image generation model processor, and a display, wherein the state and attribute acquisition device is configured to acquire a behavior text vector representing different behavior states of a device and an attribute text vector representing different display attributes of the device, wherein the basic image processor is configured to acquire an image text vector and an image feature element of a basic image, wherein the filter is configured to combine vector values of the behavior text vector, the attribute text vector, and the image text vector to obtain a relevant vector combination, the relevant vector combination comprising a combination including a value of the behavior text vector, a value of the attribute text vector, and a value of the image text vector, wherein the semantic script generation model processor is configured to input all the relevant vector combinations into a pre-trained semantic script generation model for processing to generate a semantic script text for describing latent image generation requirements, wherein the conditional image generation model processor is configured to input the semantic script text and the image feature element into a pre-trained conditional image generation model for processing to generate latent images corresponding to the different behavior states of the device, and wherein the display is configured to display the corresponding latent image based on the behavior state of the device.

12. The apparatus of claim 11, wherein the semantic script generation model processor is further configured to:

perform processing of long short-term memory (LSTM) on each input relevant vector combination, and identify effective processing results, generate an attention weight corresponding to each relevant vector combination based on an attention mechanism, and weight and fuse each effective processing result by the attention weight to obtain the semantic script text.

13. The apparatus of claim 12, wherein, in identifying of the effective processing results, the semantic script generation model processor is further configured to determine an ineffective processing result if there is no difference in processing results at different times corresponding to the relevant vector combination.

14. The apparatus of claim 11, wherein the pre-trained semantic script generation model is a hierarchical attention neural network based on LSTM.

15. One or more non-transitory computer-readable storage media storing computer-executable instructions that, when executed by one or more processors of an apparatus, cause the apparatus to perform operations, the operations comprising:

acquiring a behavior text vector representing a behavior state of a device and an attribute text vector representing a display attribute of the device;

acquiring an image text vector and an image feature element of a basic image;

combining vector values of the behavior text vector, the attribute text vector, and the image text vector to obtain a relevant vector combination, the relevant vector combination being a combination including a value of the behavior text vector, a value of the attribute text vector, and a value of the image text vector;

inputting all the relevant vector combinations into a pre-trained semantic script generation model for processing to generate a semantic script text for describing latent image generation requirements;

inputting the semantic script text and the image feature element into a pre-trained conditional image generation model for processing to generate a latent image corresponding to the behavior state of the device; and displaying the corresponding latent image based on the behavior state of the device.

16. The one or more non-transitory computer-readable storage media of claim 15, the operations further comprising:

in the pre-trained semantic script generation model, performing processing of long short-term memory (LSTM) on each input relevant vector combination, and identifying effective processing results;

generating an attention weight corresponding to each relevant vector combination based on an attention mechanism; and weighting and fusing each effective processing result by the attention weight to obtain the semantic script text.

17. An electronic device comprising:

memory storing one or more computer programs; and one or more processors communicatively coupled to the memory, wherein the one or more computer programs include computer-executable instructions that, when executed by the one or more processors, cause the electronic device to:

acquire a behavior text vector representing a behavior state of a device and an attribute text vector representing a display attribute of the device, acquire an image text vector and an image feature element of a basic image, combine vector values of the behavior text vector, the attribute text vector, and the image text vector to obtain a relevant vector combination, the relevant vector combination being a combination including a value of the behavior text vector, a value of the attribute text vector, and a value of the image text vector, input all the relevant vector combinations into a pre-trained semantic script generation model for processing to generate a semantic script text for describing latent image generation requirements, input the semantic script text and the image feature element into a pre-trained conditional image generation model for processing to generate a latent image corresponding to the behavior state of the device, and display the corresponding latent image based on the behavior state of the device.

18. The electronic device of claim 17, wherein the one or more computer programs further include computer-executable instructions that, when executed by a semantic script generation model processor, cause the electronic device to:

perform processing of long short-term memory (LSTM) on each input relevant vector combination, and identify effective processing results, generate an attention weight corresponding to each relevant vector combination based on an attention mechanism, and weight and fusing each effective processing result by the attention weight to obtain the semantic script text.

19. The electronic device of claim 18, wherein, in identifying the effective processing results, the one or more computer programs further include computer-executable instructions that, when executed by the semantic script generation model processor, cause the electronic device to determine an ineffective processing result if there is no difference in processing results at different times corresponding to the relevant vector combination.

20. The electronic device of claim 17, wherein the pre-trained semantic script generation model is a hierarchical attention neural network based on LSTM.

* * * * *